United States Patent [19]
Fleck

[11] 3,731,494
[45] May 8, 1973

[54] CONTROL APPARATUS FOR MILK COOLER
[75] Inventor: George J. Fleck, White Bear Lake, Minn.
[73] Assignee: Whirlpool Corporation, Benton Harbor, Mich.
[22] Filed: July 8, 1971
[21] Appl. No.: 160,682

[52] U.S. Cl. ........................62/157, 62/162, 62/392
[51] Int. Cl. ...................................................F25d 29/00
[58] Field of Search........................62/161, 158, 157, 62/162, 163, 201, 209, 392

[56] References Cited
UNITED STATES PATENTS

| | | | |
|---|---|---|---|
| 2,916,891 | 12/1959 | Swanson | 62/162 |
| 2,937,509 | 5/1960 | Russell | 62/162 |
| 2,945,356 | 7/1960 | Schultz | 62/392 |
| 2,978,878 | 4/1961 | Curtis | 62/162 |
| 2,986,895 | 6/1961 | Moline | 62/392 |
| 3,000,187 | 9/1961 | Mussey | 62/162 |

Primary Examiner—Meyer Perlin
Attorney—James S. Nettleton et al.

[57] ABSTRACT

An improved control apparatus for use with a milk cooler such as a farm bulk milk cooler including means for agitating milk in the tank of the cooler. The development permits manual control of the agitating function such as during milk pickup, milk addition, and cooler washing. The control is coordinated with other control elements providing different cooler functions.

9 Claims, 3 Drawing Figures

Patented May 8, 1973

INVENTOR
GEORGE J. FLECK

BY Hofgren, Wegner, Allen,
Stellman & McCord

ATTORNEYS

CONTROL APPARATUS FOR MILK COOLER

BACKGROUND OF THE INVENTION

1. Field of the Invention

This invention relates to cooling apparatus and in particular to apparatus for cooling milk and the like.

2. Description of the Prior Art

One form of improved cooler apparatus such as for use in cooling milk and the like is shown in D. F. Swanson et al. U.S. Letters Pat. No. 2,916,891 issued Dec. 15, 1959 for a Premature Cycler for Refrigeration Load, and owned by the assignee hereof. In the cooler apparatus disclosed therein, means are provided for cooling milk deposited in a cooling tank such as immediately after the milking operation. An agitator is provided for agitating milk in the tank for improved uniform cooling thereof. Further, temperature responsive means are provided for controlling the cooling of the milk and agitation thereof to maintain the milk at the desired temperature level and to avoid freezing of portions of the milk contacting the low temperature cooling means.

In such a cooler apparatus, it has further been known to provide a timer means for automatically effecting agitation of the milk for preselected periods of time at preselected intervals independently of the temperature conditions. Such periodic agitation has been found to substantially improve the cooling storage of the milk and in certain localities, has been made to be a mandatory requirement in such milk storage.

SUMMARY OF THE INVENTION

The present invention comprehends an improved milk cooler apparatus having improved means for effecting controlled agitation of the milk in such a system. More specifically, the invention comprehends providing in such a milk cooler apparatus having a tank for containing milk, means for cooling milk in the tank, and temperature responsive means for agitating milk in the tank when the temperature of the milk sensed by the temperature responsive means is above a preselected temperature, means for manually initiating operation of the agitating means regardless of the sensed temperature of the milk, and continuing the operation thereof for any one of a plurality of different preselected times.

The invention further comprehends the provision of such a manual control means including means for continuing the manually controlled agitation for any one of a plurality of different preselected times. Illustratively, the manual control means may comprise a timer which is manually operated to effect the agitation for any desired period of time up to a maximum, such as approximately 2 hours.

The manual control may be arranged to effect the desired agitation regardless of the sensed temperature of the liquid in the cooling tank. Further, the control may be arranged to effect temperature responsive control of the agitating function during the intervals between the time periods of agitation effected by the automatic periodic agitating means.

The manual control means may be arranged to effect agitation of the liquid for periods of time greater than the periods of time effected by the automatic periodic agitating control. Thus, the manual control means may be utilized in operations relative to the cooling apparatus other than the liquid cooling operations, such as in utilizing the agitating means for facilitated washing of the cooling apparatus tank.

The control means of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein.

DESCRIPTION OF THE PREFERRED EMBODIMENTS

Figure 1:
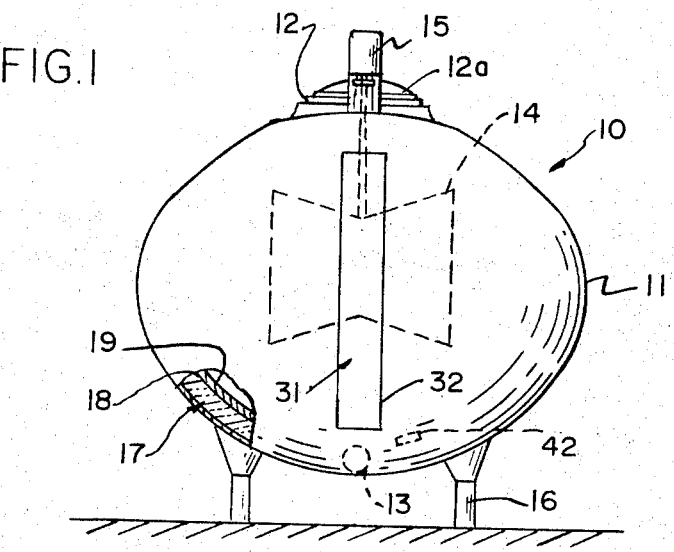
FIG. 1 is an end view of a milk cooling apparatus having improved control means embodying the invention.
Figure 2:
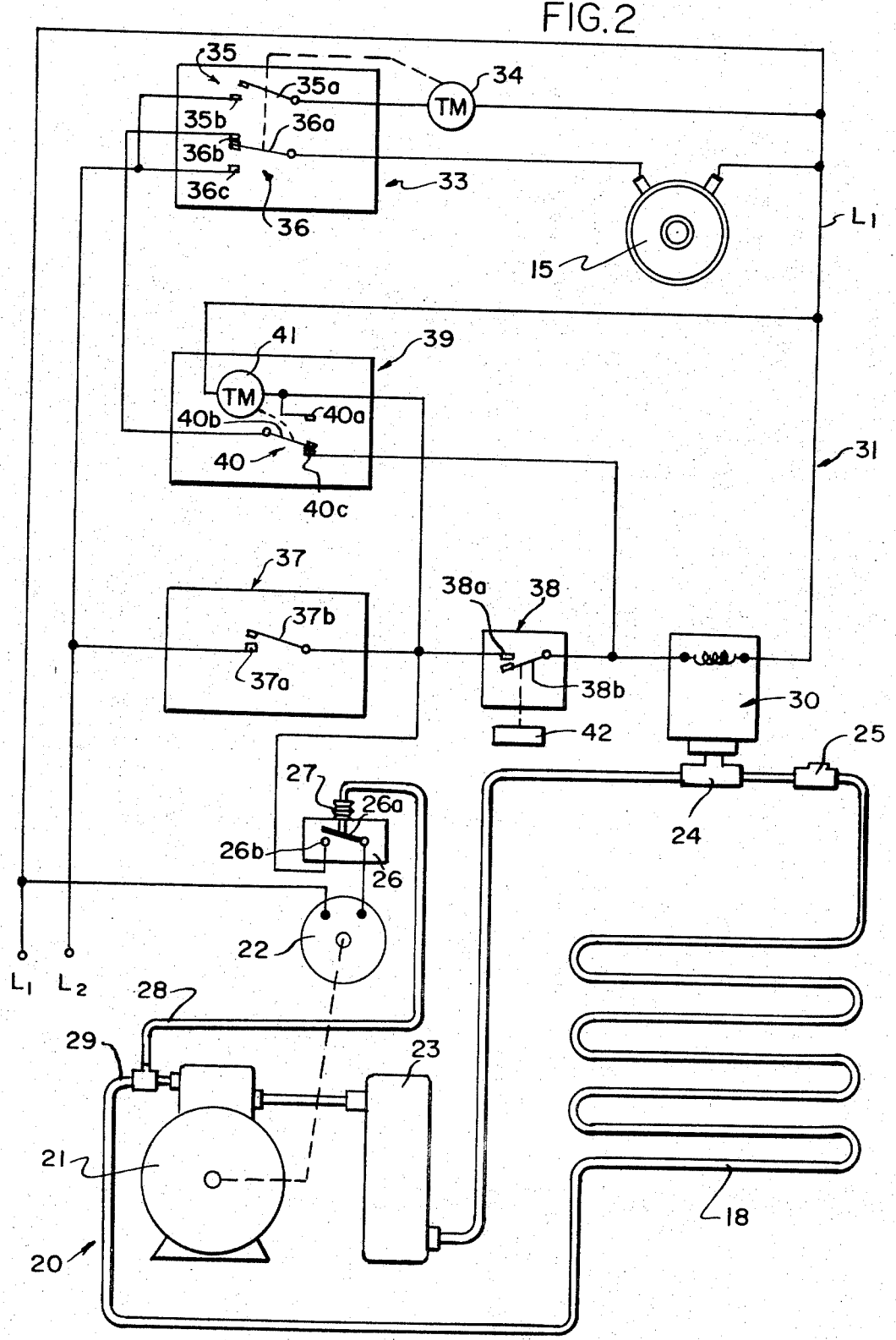
FIG. 2 is a schematic diagram illustrating the control circuitry in combination with the refrigeration apparatus thereof.

In the exemplary embodiment of the invention as disclosed in FIGS. 1 and 2, a cooler apparatus generally designated 10 is shown to comprise a tank 11 adapted for holding a liquid to be cooled, such as milk. The tank includes an access opening 12 in the top thereof closed by a suitable cover 12a and a drain 13 in the bottom portion of one end. Milk in the tank may be agitated by means of suitable paddles 14 operated by an agitator motor 15 carried at the top of the tank. As shown in FIG. 1, the tank may be carried on suitable legs 16 and is defined by an insulated wall 17 for facilitated maintenance of the desired low temperature of the milk stored therein. Cooling of the milk may be effected by conventional refrigerating means including a tubular evaporator 18 illustrated in FIG. 1 as being in thermal transfer association with the inner linear 19 of the tank wall 17.

As shown in FIG. 2, evaporator coil 18 is provided in a conventional refrigeration apparatus generally designated 20 including a compressor 21 driven by a compressor motor 22, a condenser 23, a flow control valve 24 and an expansion valve 25 serially connected by suitable ducts. Operation of compressor motor 22 is controlled by a pressure switch 26 having a pressure responsive device, such as bellows 27, connected through a duct 28 to the suction inlet 29 of the compressor for controlling movement of the moving contact 26a of the switch 26 as a function of the suction pressure of the refrigerant fluid in apparatus 20. Compressor motor 22 may be connected between one side $L_1$ of the power supply line and moving contact 26a. Control valve 24 is operated by a solenoid 30 controlled by the electrical control circuitry generally designated 31 which may be provided in a suitable control box 32 carried on an end wall of tank 11, as shown in FIG. 1.

Agitator motor 15 is connected between power supply leak $L_1$ and power supply lead $L_2$ through a manual control switch generally designated 33. The control switch comprises a manually operable timer having timer motor 34 suitably controlling the movement of moving contacts 35a and 36a of a pair of switches 35 and 36 of the manual control device. Timer motor 34 is connected between power supply lead $L_1$ and moving contact 35a of switch 35 which contact, in turn, is selectively closable with a fixed contact 35b thereof connected to power supply lead $L_2$ so that whenever the control 33 is manually operated to close switch 35, timer motor 34 is connected across the power supply to provide a preselected adjustable time period.

Concurrently with the closing of switch 35, moving contact 36a of switch 36 is thrown from engagement with a first fixed contact 36b of switch 36 to a second fixed contact 36c thereof to connect agitator motor 15 from power supply lead $L_1$ to power supply lead $L_2$ thereby effecting operation of the agitating means. The agitation cycle continues for the preset time, upon completion of which, timer control 33 restores itself to the arrangement of FIG. 2 to de-energize the timer motor 34 and break the circuit from power supply lead $L_2$ through switch 36.

Automatic operation of agitator motor 15 is effected by means of a control switch 37 connected in series with a thermostat switch 38 and solenoid 30 connected in series between power supply leads $L_1$ and $L_2$. Associated with thermostat switch 38 there is a sensing element 42 disposed in tank 11 (see FIGS. 1 and 2) and thermostat switch 38 is responsive to the temperature sensed by element 42. If the temperature sensed by the sensing element 42 is above the predetermined temperature (say about 38°F) at which thermostat switch 38 responds, thermostat switch 38 will close and moving contact 38b will be connected to fixed contact 38a. The automatic control means further includes a periodic agitation timer generally designated 39. Control switch 37 comprises a single pole, single throw switch having fixed contact 37a connected to power supply lead $L_2$ and moving contact 37b connected to fixed contact 38a of thermostat switch 38. Moving contact 38b of thermostat switch 38 is connected to solenoid 30 and the opposite side of solenoid 30 is connected to power supply lead $L_1$. Fixed contact 26b of pressure switch 26 is connected to moving contact 37b of switch 37 and a first fixed contact 40a of a single pole, double throw switch 40 of agitator timer 39. A timer motor 41 is provided in timer 39 and is connected between fixed contact 40a and power supply lead $L_1$. Moving contact 40b of switch 40 is connected to fixed contact 36b of switch 36, and a second fixed contact 40c of switch 40 is connected to the electrical conductor connecting between moving contact 38b of switch 38 and solenoid 30.

Thus, to establish normal automatic operation, the switch 37 is manually closed, thereby energizing solenoid 30 whenever thermostat switch 38 is closed as an incident of a high sensed temperature. Thus, compressor motor 22 is energized through control switch 37 and pressure switch 26 between power supply leads $L_1$ and $L_2$. Valve 24 is opened by the energization of solenoid 30 to permit a cooling operation of the refrigeration apparatus 20. Concurrently, timer motor 41 is energized from switch 37 to operate the agitator timer 39. Timer 39 is arranged to dispose moving contact 40b of switch 40 in contact with fixed contact 40c thereof for approximately 56 minutes of each hour and in contact with fixed contact 40a for the remaining 4 minutes.

Thus, during the 4-minute interval when moving contact 40b is connected to fixed contact 40a, a circuit from switch 37 is provided through moving contact 40b and moving contact 36a of switch 36 of manual control 33 to agitator motor 15 thereby causing automatic agitation of the milk in tank 11 independently of the disposition of thermostat switch 38. When the timer switch moving contact 40b is redisposed in contact with fixed contact 40c, as shown in FIG. 2, energization of the agitator motor through switch 36 is effected under the control of thermostat switch 38 by the circuit established from switch 37 through switch 38 to fixed contact 40c of switch 40. Thus, under these conditions, operation of the agitator motor 15 is effected under the control of the thermostat switch 38 so as to effect agitation of the milk in the tank 11 whenever the sensed temperature is above a preselected temperature, such as approximately 38°F.

Opening of valve 24 permits the back pressure of the refrigerant fluid in refrigeration system 20 to rise so as to increase the pressure to pressure switch actuator 27 thereby closing pressure switch 26 to permit the above discussed operation of the compressor motor 22. When the temperature sensed by the sensing element 42 in tank 11 drops sufficiently to permit thermostat switch 38 to reopen, solenoid 30 is deenergized thereby closing valve 24 and permitting the suction pressure at inlet 29 to be reduced sufficiently to cause pressure switch 26 to open thereby de-energizing the compressor motor. Agitator motor 15 concurrently becomes de-energized, assuming that the periodic timer 39 is in the position of FIG. 2, with the moving contact 40b connected to fixed contact 40c as the opening of thermostat switch 38 breaks this circuit. However, when the periodic timer 39 is repositioned to have moving contact 40b engage fixed contact 40a, a circuit to agitator motor 15 is reestablished from switch 37 bypassing thermostat switch 38 to provide agitation of the milk in tank 11 for the desired preselected period of time, such as 4 minutes, as discussed above.

Manual control switch 33 may be operated at any time independently of the functioning of thermostat switch 38 to operate the agitator motor 15 by the closing of switch 36 to fixed contact 36c. As indicated above, upon initiation of such manual controlled operation of agitator motor 15, the timer motor 34 is energized to continue the operation of the agitator motor with agitation of the milk for the desired preselected time, which herein may be up to approximately 2 hours. Thus, manual control 33 permits manual control of the blending of the milk in tank 11 so as to provide more uniform temperature thereof. This is desirable since the milk tends to stratify if it is not agitated as described herein. With the disclosed invention the proper milk blend may be readily attained to facilitate an accurate test of the milk. Such testing is customarily carried out when the milk is picked up from the tank. If a uniform blend of the milk is desired when the milk is picked up to provide for accurate test results, manual control 33 is set for, say, a 10-minute agitation cycle and the agitator will provide agitation for a 10-minute time period thereby to achieve the proper blend to facilitate an accurate test even though the thermostat switch 38 may be open because the milk in the tank at sensing element 42 is at the desired temperature level. Also, at the second and subsequent milkings, through the medium of control 33, the agitator may be operated just before and during the addition of the warm milk from such second and subsequent milkings to the cooled milk in the tank to quickly bring all of the milk in the tank to the desired temperature level.

It is therefore a feature of the present invention to provide an improved device for prematurely cycling the refrigeration circuit so as to materially reduce the normal time required for a warm milk loading to diffuse to the bottom of the milk storage tank and warm the thermostat sensing element 42. With the present invention, at a warm milk loading the manual control 33 is set for, say, a 15-minute agitation cycle and the agitator will quickly raise the temperature of all of the milk in the tank to a uniform temperature and cause initiation of the cooling cycle at an earlier time, resulting in a faster cooling operation.

The disclosed invention thus provides means for avoiding undesirable pockets of warm milk spaced from the sensing element 42 which may tend to breed bacteria in tank 11 notwithstanding the low temperature of the portions of the milk adjacent the sensing element. The manual control of agitator motor 15 further permits facilitated use thereof in the washing of the tank as the provision of the timing function in association with the control 33 permits an automatic controlled washing cycle timing. If the wash cycle is, say, 55 minutes long, the control switch 37 is maintained open to preclude refrigeration during the wash cycle, and the manual control 33 may be set for 1 hour to provide agitation during the wash cycle with no refrigeration during this time period.

Figure 3:
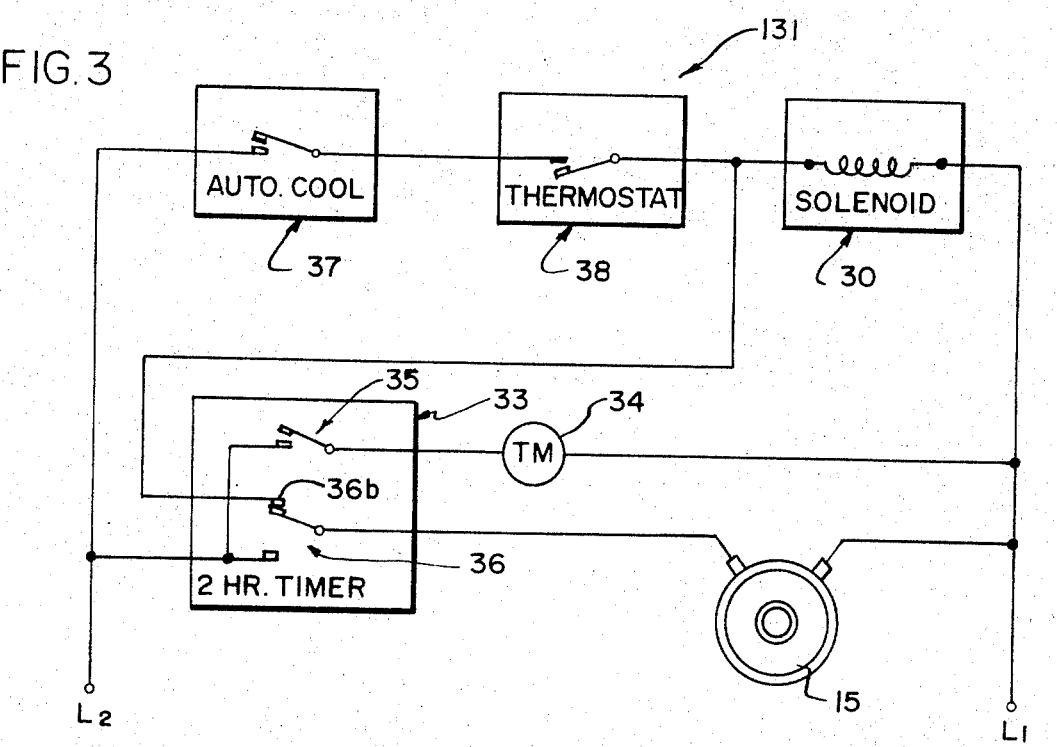
FIG. 3 is a fragmentary schematic diagram illustrating a modified form of control for use therein.

Turning now to FIG. 3, a modified form of control generally designated 131 for use with such a milk cooler apparatus is shown to comprise a control similar to control 31 but eliminating the periodic timer 39. Thus, in control 131, the connection from between thermostat switch 38 and solenoid 30 is made directly to fixed contact 36b of switch 36. Thus, the control circuit 131 functions similarly to control circuit 31 except for the omission of the periodic timing function provided by switch 39 in control 31.

Thus, the invention comprehends an improved milk cooling apparatus providing a number of different controls of the agitation of the milk for improved storage. The structure of the present invention is extremely simple and economical while yet providing the highly desirable features discussed above.

The foregoing disclosure of specific embodiments is illustrative of the board inventive concepts comprehended by the invention.

The embodiments of the invention in which an exclusive property or privilege is claimed are defined as follows:

1. In a milk cooler apparatus having a tank for containing milk, means for cooling milk in said tank, and temperature responsive means for agitating milk in said tank when the temperature of the milk sensed by said temperature responsive means is above a preselected temperature, manually operable means for manually initiating operation of the agitating means regardless of the sensed temperature of the milk, and timer means for continuing the manually initiated operation thereof for any one of a plurality of different preselected times.

2. The milk cooler apparatus of claim 1 wherein said means for continuing the operation is infinitely adjustable up to a preselected maximum time.

3. The milk cooler apparatus of claim 1 wherein said means for manually initiating operation of the agitating means comprises a manually controlled timer including a timer motor and circuitry for holding the timer motor energized for any one of a plurality of different preselected times.

4. The milk cooler apparatus of claim 3 wherein said timer is arranged to provide timed control of said agitation up to a maximum of approximately 2 hours.

5. In a milk cooler apparatus having a tank for containing milk, means for cooling milk in said tank, and temperature responsive means for agitating milk in said tank when the temperature of the milk sensed by said temperature responsive means is above a preselected temperature, means for manually initiating operation of the agitating means regardless of the sensed temperature of the milk, means for continuing the manually initiated operation thereof for any one of a plurality of different preselected times, and means for automatically operating said agitating means for a preselected period of time at preselected intervals regardless of the sensed temperature of the milk.

6. The milk cooler apparatus of claim 5 wherein said temperature responsive means is connected to said means for automatically operating said agitating means for controlling said agitating means as a function of the sensed temperature during the intervals between successive such periods of time.

7. The milk cooler apparatus of claim 5 further including manually operable means for terminating operation of the agitating means by said means for automatically operating said agitating means during said preselected period of time.

8. The milk cooler apparatus of claim 5 wherein said means for manually initiating operation of the agitating means comprises a manually controlled timer including a timer motor and circuitry for holding the timer motor energized for any one of a plurality of different preselected times up to a maximum time greater than the maximum period time of operation effected by said means for automatically operating said agitating means.

9. A premature cycler for a milk cooler apparatus having a tank for containing milk, means for cooling milk in said tank, means for agitating milk in said tank to achieve a uniform blend of the milk in said tank, temperature responsive means for controlling the operation of said cooling means and said agitating means when the temperature of the milk sensed by said temperature responsive means is above a preselected temperature, and means for manually initiating operation of the agitating means regardless of the sensed temperature of the milk, and continuing the operation thereof for a preselected time period, thereby to achieve faster blending and cooling of all of the milk in the tank when adding a load of warm milk to a quantity of cool milk in the tank.

* * * * *